(12) United States Patent
Rao

(10) Patent No.: US 12,017,143 B2
(45) Date of Patent: Jun. 25, 2024

(54) METHOD AND DEVICE FOR SELECTING GAME OBJECT AND STORAGE MEDIUM

(71) Applicant: NETEASE (HANGZHOU) NETWORK CO., LTD., Zhejiang (CN)

(72) Inventor: Feng Rao, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 337 days.

(21) Appl. No.: 17/434,022

(22) PCT Filed: Dec. 13, 2019

(86) PCT No.: PCT/CN2019/125289
§ 371 (c)(1),
(2) Date: Aug. 26, 2021

(87) PCT Pub. No.: WO2020/181867
PCT Pub. Date: Sep. 17, 2020

(65) Prior Publication Data
US 2022/0134229 A1    May 5, 2022

(30) Foreign Application Priority Data
Mar. 11, 2019  (CN) .......................... 201910178780.1

(51) Int. Cl.
*A63F 13/5372* (2014.01)
*A63F 13/42* (2014.01)
*A63F 13/52* (2014.01)
*A63F 13/55* (2014.01)
*A63F 13/60* (2014.01)

(52) U.S. Cl.
CPC .............. *A63F 13/55* (2014.09); *A63F 13/42* (2014.09); *A63F 13/52* (2014.09); *A63F 13/5372* (2014.09); *A63F 13/60* (2014.09)

(58) Field of Classification Search
None
See application file for complete search history.

(56) References Cited

U.S. PATENT DOCUMENTS

| | | | |
|---|---|---|---|
| 2005/0159223 A1 * | 7/2005 | Tahara | A63F 13/537 463/43 |
| 2016/0256777 A1 * | 9/2016 | Umebayashi | A63F 13/00 |
| 2018/0036638 A1 | 2/2018 | Tamura | |

FOREIGN PATENT DOCUMENTS

| | | |
|---|---|---|
| CN | 106422329 A | 2/2017 |
| CN | 106512406 A | 3/2017 |
| CN | 107583271 A | 1/2018 |

(Continued)

*Primary Examiner* — Damon J Pierce
(74) *Attorney, Agent, or Firm* — Qinghong Xu

(57) ABSTRACT

A method and device for selecting a game object and a storage medium are provided. The method includes: in response to an object selection operation acting on a first display area on a graphical user interface, selecting multiple game objects in a game scene; and displaying an object selection control in a second display area of the graphical user interface. Multiple game objects are selected by an object selection operation. A first game object indicator and/or a second game object indicator is further displayed in an object selection control, and respectively corresponds to different game objects or types of game objects.

20 Claims, 7 Drawing Sheets

(56) References Cited

FOREIGN PATENT DOCUMENTS

| | | |
|---|---|---|
| CN | 107694089 A | 2/2018 |
| CN | 107930122 A | 4/2018 |
| CN | 107967096 A | 4/2018 |
| CN | 108014493 A | 5/2018 |
| CN | 108144293 A | 6/2018 |
| CN | 108970120 A | 12/2018 |
| CN | 109847355 A | 6/2019 |
| JP | 2008148860 A | 7/2008 |
| JP | 2016-179027 A | 10/2016 |
| JP | 6018720 | 4/2017 |
| JP | 6453500 | 8/2019 |

* cited by examiner

METHOD AND DEVICE FOR SELECTING GAME OBJECT AND STORAGE MEDIUM

CROSS-REFERENCE TO RELATED APPLICATIONS

The present disclosure claims priority to Chinese Patent Application No, 201910178780.1, filed on Mar. 11, 2019 and named after "Method and Apparatus for Selecting Game Object". Contents of the present disclosure are hereby incorporated by reference in entirety of the Chinese Patent Application.

TECHNICAL FIELD

The present disclosure relates to the technical field of games, and in particularly, to a method and a device for selecting a game object and a storage medium.

BACKGROUND

In some games, a game player may need to select at least one operating object to perform corresponding at least one virtual behavior action, for example, at least one target attack object is selected, and at least one target controlled object is selected. With a development of a mobile communication technology, more and more mobile terminal games have emerged. Due to the limitations of hardware conditions and interaction modes, most of control modes in traditional PC-side games cannot be transplanted to the mobile terminal games, so that the mobile terminal games and the traditional PC-side games are greatly different in the control modes of object selection.

SUMMARY

In a first aspect, an embodiment of the disclosure provides a method for selecting a game object. The method may be applied to a terminal rendered with a graphical user interface, wherein contents displayed on the graphical user interface may include a first display area and a second display area, and the first display area may include at least a part of a game scene. The method may include the following steps:
  in response to an object selection operation acting on the first display area on the graphical user interface, multiple game objects in the game scene are selected;
  an object selection control is displayed in the second display area of the graphical user interface;
  when the multiple game objects belong to the same type of game objects, a first number of first game object indicators are displayed in the object selection control, wherein each of the first number of first game object indicators corresponds to each of the game objects; and/or
  when the multiple game objects belong to different types of game objects, a second number of second game object indicators are displayed in the object selection control, wherein each of the second number of second game object indicators corresponds to each type of the game objects.

In a second aspect, an embodiment of the disclosure provides a device for selecting a game object, which may include:
  a processor, and
  a memory, connected with the processor and configured to store at least one executable instruction of the processor,
  wherein the processor is arranged to execute the at least one executable instruction, and the at least one executable instruction comprises:
  in response to an object selection operation acting on a first display area on a graphical user interface, multiple game objects in a game scene are selected;
  an object selection control is displayed in a second display area of the graphical user interface;
  when the multiple game objects belong to the same type of game objects, a first number of first game object indicators are displayed in the object selection control, wherein each of the first number of first game object indicators corresponds to each of the game objects; and
  when the multiple game objects belong to different types of game objects, a second number of second game object indicators are displayed in the object selection control, wherein each of the second number of second game object indicators corresponds to each type of the game objects.

In a third aspect, an embodiment of the disclosure provides a non-transitory storage medium, which may store a computer program, on which at least one computer program is stored, the at least one computer program being executed by a processor to implement the following steps:
  in response to an object selection operation acting on the first display area on the graphical user interface, multiple game objects in the game scene are selected;
  an object selection control is displayed in the second display area of the graphical user interface;
  when the multiple game objects belong to the same type of game objects, a first number of first game object indicators are displayed in the object selection control, wherein each of the first number of first game object indicators corresponds to each of the game objects; and
  when the multiple game objects belong to different types of game objects, a second number of second game object indicators are displayed in the object selection control, wherein each of the second number of second game object indicators corresponds to each type of the game objects.

DETAILED DESCRIPTION OF THE EMBODIMENTS

In order to make the objectives, technical solutions, and advantages of the embodiments of the disclosure clearer, the technical solutions in the embodiments of the disclosure will be clearly and completely described below with reference to the drawings in the embodiments of the disclosure. It is apparent that the described embodiments are a part of the embodiments of the disclosure, not all of the embodiments. All other embodiments obtained by those of ordinary skill in the art based on the embodiments of the disclosure without creative efforts should fall within the scope of protection of the disclosure.

Figure 1:
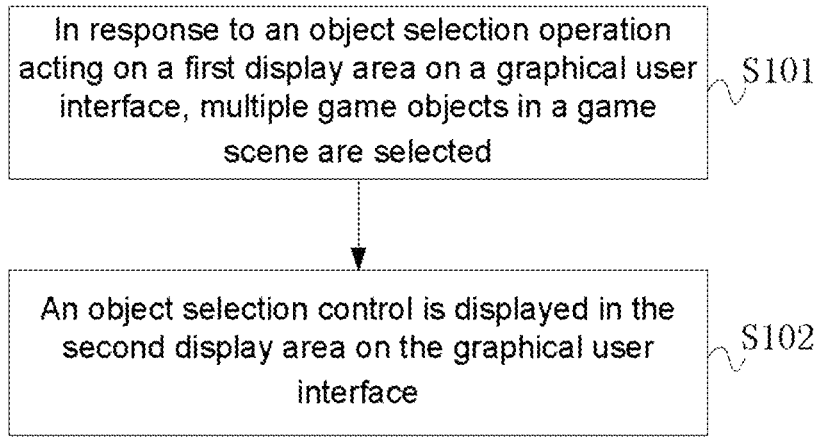
FIG. 1 is a flowchart 1 of a method for selecting a game object according to one embodiment of the disclosure.

FIG. 1 is a flowchart 1 of a method for selecting a game object according to an embodiment of the disclosure. As shown in FIG. 1, the method includes the following steps.

At S101, in response to an object selection operation acting on a first display area on a graphical user interface, multiple game objects in a game scene are selected.

Specifically, the graphical user interface refers to a computer operation user interface displayed in a manner of graphical, which allows a player to use an input device to manipulate at least one icon or menu control on a screen. The input device may be, for example, a mouse or a touch screen, etc. The present embodiment is not limited thereto. During a process of a game, a player operates through the graphical user interface to interact with a client or a server.

In an optional embodiment, the object selection operation includes a selection operation that determining the multiple game objects by a sliding touch operation. For example, a closed sliding trajectory (for example, a regular shape trajectory such as a circle or a rectangle, or other irregular closed shape trajectories) is drawn in the graphical user interface, and the multiple game objects are selected according to the closed sliding trajectory; or, a closed area may be determined through an unclosed sliding trajectory (for example, a diagonal of a rectangle is determined according to a starting point and an end point of the sliding trajectory, and a rectangle is determined according to a preset aspect ratio, or a diameter is determined according to the starting point and end point of the sliding trajectory, and a circle is determined according to the diameter), and the multiple game objects may be selected according to the closed sliding trajectory. In this way, it is convenient and quick to select the multiple game objects.

In the present embodiment, contents displayed on the graphical user interface include a first display area and a second display area, and the first display area includes at least a part of the game scene, and the second display area may include, for example, a game menu, and may also include, for example, a control corresponding to the game and the like. The second display area is not limited herein. Optionally, the second display area may be stacked and displayed above the first display area. For example, the first display area may be provided on the left side of the graphical user interface. The second display area may be located on the right side of the graphical user interface. The embodiments of the disclosure do not specifically limit a specific implementation manner of the first display area and the second display area.

Furthermore, when a player needs to select a game object in the game scene, an object selection operation is performed on the first display area on the graphical user interface by using an input device (for example, a touch operation medium), wherein the object selection operation may be, for example, triggering a selection control on the first display area. Specifically, a mode for triggering may be, for example, a tap operation, or may be, for example, a long pressing operation, so as to control the first display area to enter a selection mode. In the selection mode, for example, an operation of object selection may be performed by acquiring a circle operation on the first display area. For example, the operation of object selection may be performed by acquiring a tap operation on the first display area.

The object selection operation may also be, for example, a double-clicking operation acted on an input device to control the first display area to enter the selection mode, and then performing the object selection in the selection mode. Optionally, the object selection operation may also be, for example, clicking at least one game object to be selected one by one. For another example, an input box of an arbitrary shape may be input on the graphical user interface through the input device to perform the object selection operation. The embodiment of the disclosure does not specifically limit the specific implementation method of the object selection operation. Any operation of object selection on the graphical user interface all belongs to the protection scope of the embodiments of the disclosure.

In the present embodiment, in response to an object selection operation acting on the first display area on the graphical user interface, multiple game objects are selected in the game scene, wherein the multiple selected game objects at least include objects to be selected by the player. Further, because in some games (for example, RTS games), a distribution of game objects in the game scene is relatively dense (especially in a mobile terminal), the game objects selected may include objects that are selected due to false operation but not desired by the player.

At S102, an object selection control is displayed in the second display area of the graphical user interface.

Specifically, after the multiple game objects in the game scene are selected, the object selection control is displayed on the second display area of the graphical user interface according to related information of the game objects selected, wherein the object selection control may be displayed, for example, at the upper right corner of the graphical user interface, or may also be displayed, for example, in the center of the graphical user interface. The embodiment of the disclosure does not specifically limit a display position of the object selection control.

Further, the object selection control is used for displaying related information of the game objects selected, wherein the related information of the game objects selected may be, for example, a graphic or file indication information of the game objects selected (for example, avatar/icon indication information and name indication information). For example, the related information of the game objects selected may also be a number of the game objects selected, and a blood volume or game economy of the game objects selected, etc. The present embodiment does not limit this.

The related information of the game objects selected may include text, numbers, letters, or pictures. The present embodiment does not particularly limit the implementation method of displaying the related information of the game objects in the object selection control. For example, an icon of each of the game objects selected may be displayed on the object selection control, and a blood volume of each of the game objects selected may be displayed below the icon of each of the game objects selected. For another example, a name identity of each of the game objects selected may also be displayed below the icon of each of the game objects selected, and a number of the game objects selected may be displayed above the name identity. In the embodiment of the disclosure, the related information of the game objects selected displayed by the object selection control and the specific display mode are not particularly limited, and those skilled in the art can understand that a specific implementation method of the object selection control may be designed according to needs.

Optionally, in the present embodiment, when the above-mentioned game objects selected contain game objects that are selected due to false operation but not desired by a player, the related information of the game objects that are selected due to false operation will also be displayed in a display control.

Optionally, when the multiple game objects belong to the same type of game objects, a first number of first game object indicators are displayed in the object selection control, wherein each of the first game object indicators corresponding to each of game objects. Optionally, the first number is less than or equal to a number of game the objects selected.

Specifically, when the multiple game objects selected by the object selection operation all belong to the same type, for example, the multiple game objects selected are only "Long Soldier", a first number of first game object indicators are displayed in the object selection control, wherein the first number is a number corresponding to the game objects selected by the player. The embodiment of the disclosure does not limit the specific value of the first number.

Further, each of the first game object indicators corresponds to each of the game objects selected by the player through the object selection operation, specifically, each of the first game object indicators may include, for example, a name or icon of each of the game objects selected by the player, and may also include the blood volume of each of the game objects selected by the player. The embodiment of the disclosure does not limit the specific implementation method of each of the first game object indicators.

The first number of first game object indicators may be displayed in the object selection control, in a row, or may be displayed in the object selection control in a column. The embodiment of the disclosure does not limit a specific display method of each of the first game object indicators.

Optionally, in response to a fourth touch operation acting on at least one first game object indicator, the game objects corresponding to the at least one first game object indicator are deselected; or, in response to a fifth touch operation acting on at least one second game object indicator, each type of the game types corresponding to each of the second number of second game object indicators are deselected. In this way, the game objects that are mistakenly selected can be easily and quickly removed, and a fast and accurate selection of the game objects can be achieved. Specifically, the fourth touch operation and the fifth touch operation may be distinguished from the second touch operation and the third touch operation.

Optionally, when the multiple game objects belong to different types of the game objects, a second number of second game object indicators are displayed in the object selection control, each of the second game object indicators corresponding to each type of the game objects. Optionally, the second number is less than or equal to a number of types of the multiple game objects.

Specifically, the multiple game objects belong to different types of game objects. For example, the player selects "Pikeman", "Infantry" and "Artillery" through the object selection operation. At this time, each of the game objects selected correspond to each type, and a second number of second game object indicators are displayed in the object selection control, wherein the second number is a number of types corresponding to the game objects selected by the player, and a value of the second number is not specifically limited herein.

Further, each of the second game object indicators corresponds to each type of the game objects selected by the player. Specifically, each of the second game object indicators may include, for example, a name or icon of the type of each of the game objects selected by the player, and may also include a number of specific game objects under a game type selected by the player. The embodiment of the disclosure does not limit a specific implementation method and display of the second game object indicator.

The game objects selected displayed in the object selection control may include game objects that are selected due to false operation but not desired by players. Herein, for example, at least one first game object indicator or at least one second game object indicator may be operated to perform a precise game object selection, so as to implement a selection of game objects desired by the players, so that specific game objects can be selected accurately and efficiently.

The method for selecting a game object provided by the embodiment of the disclosure includes that: in response to an object selection operation acting on a first display area on a graphical user interface, multiple game objects in a game scene are selected; an object selection control is displayed in a second display area of the graphical user interface; when the multiple game objects belong to the same type of game objects, a first number of first game object indicators are displayed in the object selection control, wherein each of the first number of first game object indicators corresponds to each of the game objects; and when the multiple game objects belong to different types of game objects, a second number of second game object indicators are displayed in the object selection control, wherein each of the second number of second game object indicators corresponds to each type of the game objects. Multiple game objects are selected by an object selection operation, and a first number of first game object indicators or a second number of second game object indicators are further displayed on an object selection control, and each of the first number of first game object indicators or the second number of second game object indicators respectively corresponds to each of the game objects or each type of the game objects. Further, at least one first object indicator or at least one second object indicator may be operated to implement a selection of at least one specific target object accurately and efficiently, and a game experience of the player can be improved.

Based on the above embodiment, specific display contents of the object selection control may be designed according to a type of each of the game object selected, etc. The method for selecting a game object provided by the embodiment of the disclosure will be further described in detail below with reference to FIG. 2 to FIG. 5.

Figure 2:
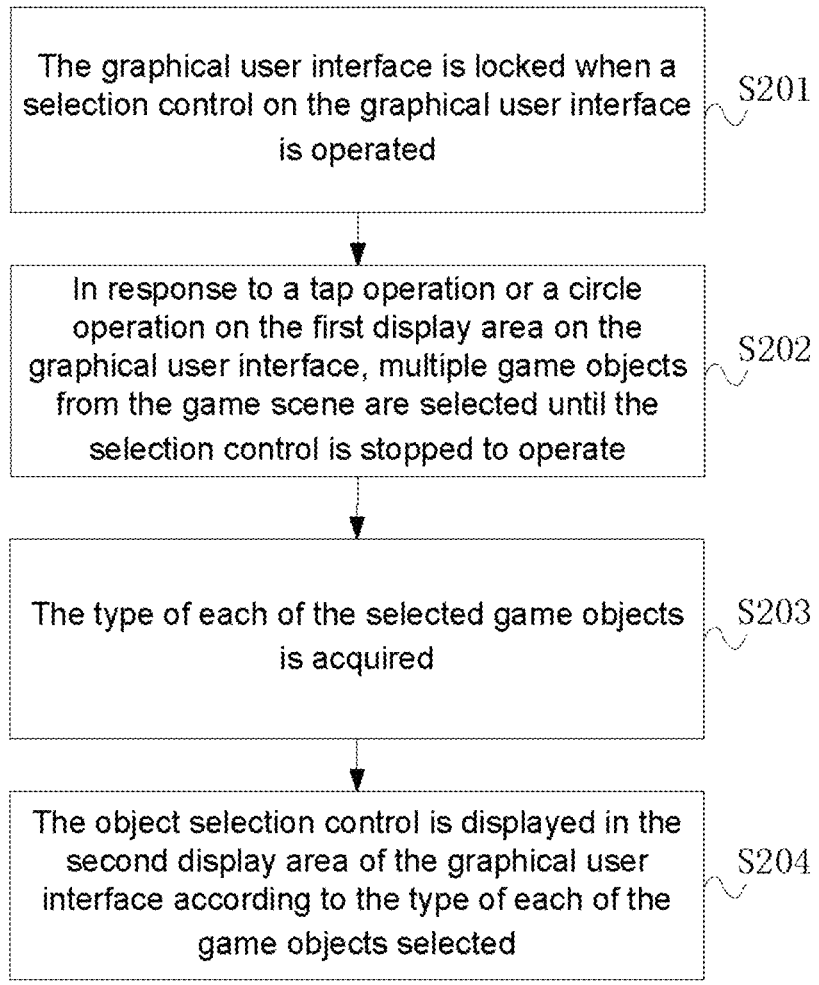
FIG. 2 is a flowchart 2 of a method for selecting a game object according to one embodiment of the disclosure.
Figure 3:
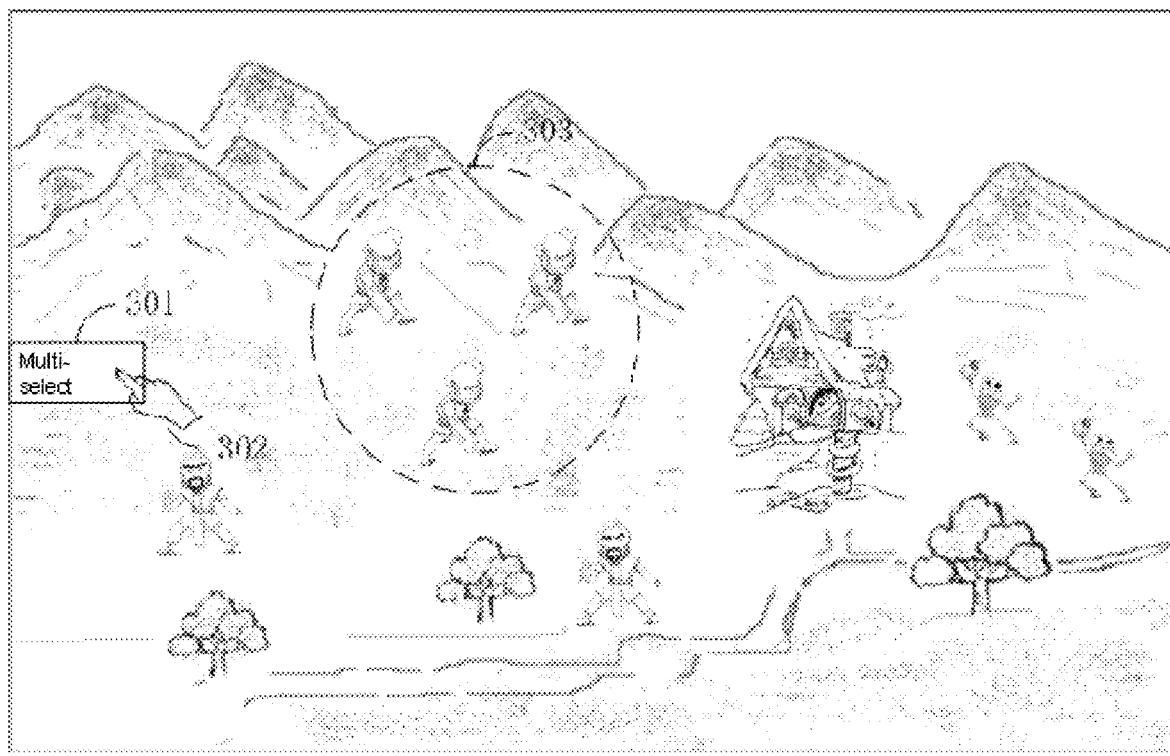
FIG. 3 is a schematic interface diagram 1 of a method for selecting a game object according to one embodiment of the disclosure.
Figure 4:
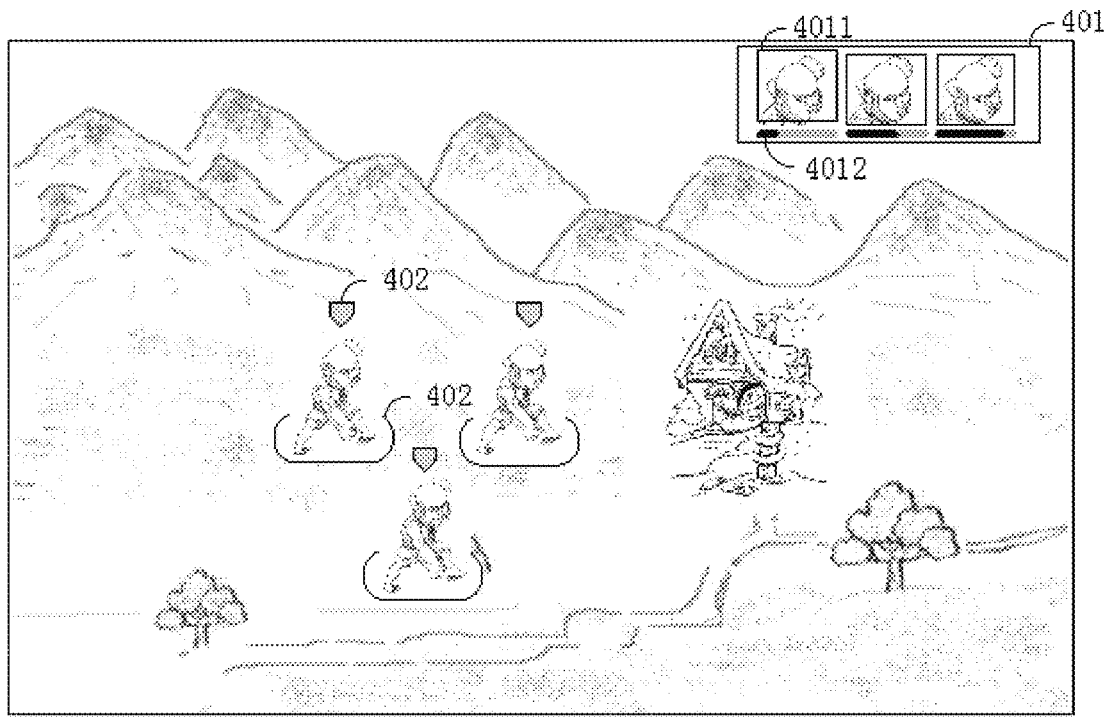
FIG. 4 is a schematic interface diagram 2 of a method for selecting a game object according to one embodiment of the disclosure.
Figure 5:
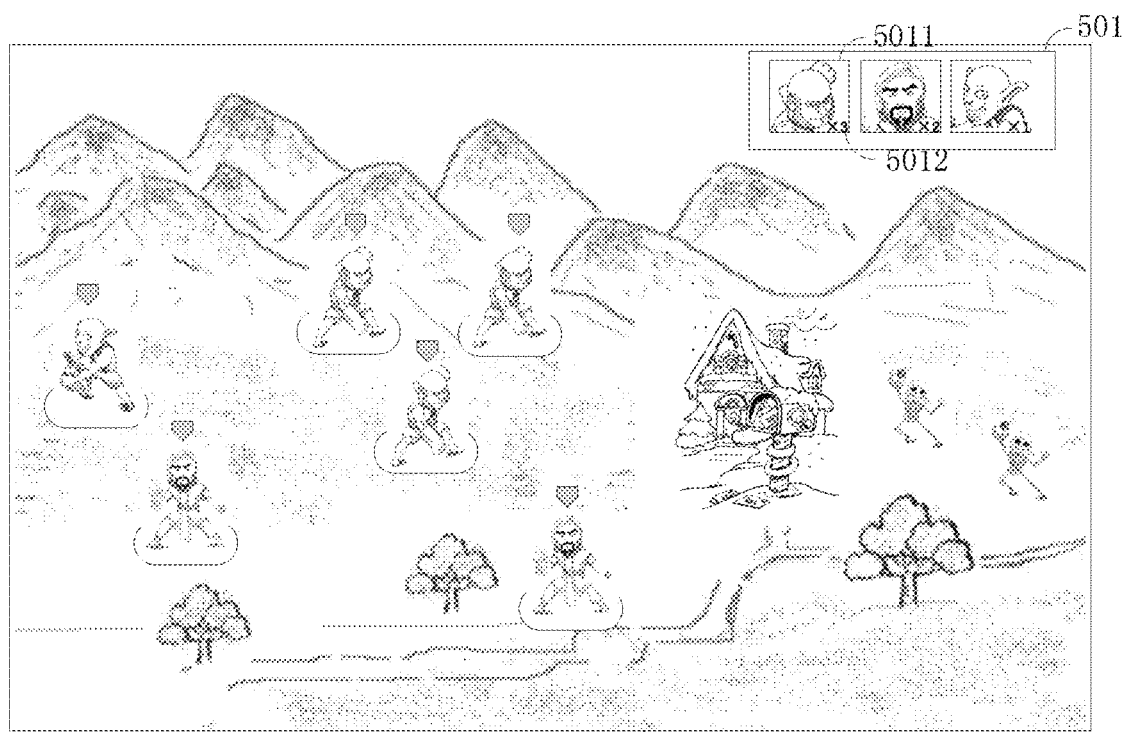
FIG. 5 is a schematic interface diagram 3 of a method for selecting a game object according to one embodiment of the disclosure.

FIG. 2 is a flowchart 2 of a method for selecting a game object according to one embodiment of the disclosure. FIG. 3 is a schematic interface diagram 1 of a method for selecting a game object according to one embodiment of the disclosure. FIG. 4 is a schematic interface diagram 2 of a method for selecting a game object according to one embodiment of the disclosure. FIG. 5 is a schematic interface diagram 3 of a method for selecting a game object according to one embodiment of the disclosure.

As shown in FIG. 2, the method includes the following steps.

At S201, the graphical user interface is locked when a selection control on the graphical user interface is operated.

Specifically, the selection control on the graphical user interface may include, for example, a multi-select control. By clicking the multi-select control or long-pressing the multi-select control, the graphical user interface is controlled to enter a state of selecting game objects. The above is only an exemplary introduction, not a unique implementation method, the embodiments of the disclosure do not specifically limit a specific implementation method of the selection control.

Further, a description is performed with an example that the graphical user interface is controlled to enter the state of selecting the game objects by long-pressing the multi-select control. The graphical user interface is locked when the selection control is long-pressed, thereby ensuring an efficiency of the object selection operation and avoiding a problem that the selection efficiency is reduced due to sliding of the graphical user interface during the object selection operation is operated.

At S202, in response to a tap operation or a circle operation on the first display area on the graphical user interface, multiple game objects from the game scene are selected until the selection control is stopped to operate.

Specifically, for example, the game objects selected may be determined by a tap operation. For example, a specific object in the first display area may be clicked by the tap operation, or for example, multiple objects in the first display area may be clicked in sequence, thereby implementing a selection of the multiple game objects.

Optionally, for example, the game objects selected may be determined by a circle operation. For example, a specific game object in the first display area interface may be circled by the circle operation, or for example, multiple game objects may be circled at a time by the circle operation, thereby implementing a selection of the multiple objects.

In the present embodiment, the multiple game objects in the game scene are selected by in response to the tap operation or the circle operation acting on the first display area, and multiple game objects from the first display area are selected until the selection control is stopped to operate. During this period, the object selection operation may be repeated. When the selection control is stopped to operate, the graphical user interface exits the state of selecting the game objects.

The object selection operation is further described in detail below with reference to FIG. 3. As shown in FIG. 3, contents displayed on the graphical user interface includes a multi-select control 301. Through an operation 302 of long-pressing the multi-select control 301, the graphical user interface is controlled to enter the state of selecting the game objects. Further, game objects may be selected by performing a circle operation on the first display area. For example, a circle trajectory 303 may be triggered by the circle operation, then the game objects contained in the circle trajectory 303 is selected, and the object selection operation may be continued until the multi-select control 301 is released.

The present embodiment provides a selection control to control the graphical user interface to enter the state of selecting game objects, and further implements the selection of game objects through the circle operation or a tap operation, which can effectively realize an efficient selection of specific objects and solve a problem of conflicts of various operations in the game.

At S203, the type of each of the selected game objects is acquired.

Specifically, after the game objects selected are acquired in response to the object selection operation, a type of each of the objects selected is acquired, wherein the type of each of the game objects selected may have each design according to each game. Taking a battle game as an example, the type of each of the game objects selected may be, for example, an infantry, or an archer.

Optionally, taking a development game as an example, the type of each of the game objects selected may be, for example, a wall, or a house. Those skilled in the art may understand that the type of each of the game objects selected may have each design according to a specific game, which are not limited in the embodiments of the disclosure.

At S204, the object selection control is displayed in the second display area of the graphical user interface according to the type of each of the game objects selected.

Further, the type of each of the game objects selected may be one type or multiple types, and a number of specific types is determined according to the game objects selected acquired by the selection operation.

In the present embodiment, the object selection control is displayed in the second display area of the graphical user interface according to the type of each of the game objects selected. Specifically, when the multiple game objects belong to the same type of game objects, the first number of first game object indicators are displayed in the object selection control, wherein each of the first game object indicators corresponds to each of the game objects.

Optionally, when the multiple game objects belong to different types of game objects, the second number of second game object indicators are displayed in the object selection control, wherein each of the second number of second game object indicators corresponds to each type of the game objects.

By displaying the object selection control according to the type of each of the game objects, the related information of the game objects selected can be clearly and effectively displayed to the player, so that the player can further select at least one specific game object as needed, thereby the game experience of the player is improved.

In a possible implementation method, each of the first game object indicators may include first information, wherein the first information is used for indicating a preset attribute of each of the different game objects.

Specifically, when the multiple game objects selected are the same type of game objects, a first number of first game object indicators is displayed in the object selection control, wherein each of the first game object indicators include the first information, and the first information is used for indicating the preset attribute of each of the different game objects, wherein the first information may be, for example, a blood volume of each of the game objects selected, or may be, for example, an icon corresponding to each of the game objects selected, etc. The embodiment of the disclosure does not specifically limit the first information.

The first game object indicator and the first information will be further described in detail below with reference to FIG. 4. As shown in FIG. 4, an area containing part of the game scene is the first selection area, and an area where the object selection control is displayed at an upper left corner is the second display area. FIG. 4 is only an exemplary introduction, and is not a unique implementation method. The embodiments of the disclosure do not limit a specific design of the first selection area and the second selection area.

Further, assuming that three game objects are currently selected in the first display area in response to the object selection operation, and the three game objects selected are the same type of game objects, then the object display control 401 includes three first game object indicators. Each of the three game object indicators corresponds to a game object selected on the graphical user interface. Taking object information of a game object selected which is one of the three game objects selected as an example for explanation, assuming that the first information includes a blood volume and an icon of the game object selected, and the first game object indicator displayed in the object display control 401 includes an icon 4011 and a survival indicator 4012 of the game object selected. The object icon 4011 identifies icon information of the game object selected, and the survival indicator 4012 shows a life state of the game object selected.

The design of the object selection control 401 shown in FIG. 4 is for illustrative purposes only, and is not a unique implementation method. A specific implementation method of the object selection control 401 and an installation location are not particularly limited in the embodiments of the disclosure. Further, FIG. 4 is described by taking the type of each of the objects selected as an example. When there are multiple types of each of the game objects selected, the implementation method is similar. For example, when a currently game object selected belongs to two types, the related object information of the currently object selected may be displayed in two lines in the object selection control. For example, one line may be for one type. The above is only an example. The implementation method in other cases is similar and will not be repeated herein.

Optionally, when game objects on the graphical user interface are selected, the game objects selected may be highlighted or identified, so that the player can more intuitively observe the game objects selected. As shown in FIG. 4, a selected identifier 402 may be used for displaying the game objects selected, so as to show the player that current game objects are selected. FIG. 4 is only an exemplary introduction, and is not a unique implementation method. An identification manner of the game objects selected is not specifically limited in the embodiment of the disclosure.

In a possible implementation method, each of the second game object indicators include second information and third information, wherein the second information is used for indicating the type of each game object corresponding to the second information, and the third information is used for indicating a number of game objects selected from game objects having the type of each game object corresponding to the third information.

Specifically, when the multiple game objects selected belong to different types of game objects, a second number of second game object indicators are displayed in the object selection control, wherein each of the second game object indicators include second information and third information, and the second information is used for indicating the type of each game object corresponding to the second information, and the third information is used for indicating a number of game objects selected from game objects having the type of each game object corresponding to the third information. The first information may be, for example, a type icon or name identifier of the game object selected. The third information may be, for example, a number of game objects selected under a current type, etc. The embodiment of the disclosure does not specifically limit the second information and the third information.

In the present embodiment, the third information may be displayed below the second information, for example, or at the center of the second information. Specific design and placement of the second game object indicator by the embodiment of the disclosure are not particularly limited.

The second game object indicator, the second information, and the third information are further described in detail below with reference to FIG. 5. As shown in FIG. 5, assuming that a currently game objects selected have three types, the object selection control 501 includes three second game object indicators. Further, each of the three second game object indicators include a type icon of the corresponding type and a number of all game objects corresponding to the type. Taking one of the three second game object indicators as an example, assuming that a number of currently game objects selected for a type corresponding to the one second game object indicators 3, a type icon 5011 of this type and a number 5012 of all objects corresponding to this type in the multiple game objects selected are displayed in the second game object indicator. FIG. 5 is only an exemplary introduction, and the embodiment of the disclosure does not specifically limit an implementation method of the second game object indicator.

The method for selecting a game object provided by the embodiment of the disclosure includes that: the graphical user interface is locked when a selection control on the graphical user interface is operated. In response to a tap operation or a circle operation on the first display area on the graphical user interface, multiple game objects from the game scene are selected until the selection control is stopped to operate. The type of each of the game objects selected is acquired. An object selection control is displayed in the second display area of the graphical user interface according to the type of each of the game objects selected. A selection of game objects is implemented through the selection control and the tap operation or circle operation of the first display area, so that an efficient selection of the specific objects can be effectively achieved, and a problem of conflicts of various operations in the game can be solved. Further, the object selection control is displayed according to the type of each of the game objects selected, so that the player can more efficiently find the required target object, and further select and control the target object, thereby the game experience of the player is improved.

Based on the above embodiments, when the multiple game objects belong to different types of game objects, the object selection method provided by the embodiment of the disclosure further includes the following step.

In response to a first touch operation acting on at least one second game object indicator, a third number of first game object indicators are displayed in the object selection control. Optionally, game objects corresponding to the third number of the at least one first game object indicator are the same type, and the type is a game type corresponding to the at least one second game object indicator determined by the first touch operation.

Specifically, the first touch operation may be, for example, a tap operation or a double-tap operation, etc. The embodiment of the disclosure does not limit this. By in response to the first touch operation acting on the at least one second game object indicator, a third number of first game object indicators may be displayed in the object selection control, wherein the third number is a specific number of game objects in the types of the different game object corresponding to the current at least one second game object indicator. The embodiment of the disclosure does not particularly limit a specific value of the third number. The first game object indicator has been introduced in the above embodiments, and will not be repeated herein.

Further, a method of displaying the third number of first game object indicators in the object selection control may be, for example, expanding and displaying, below an icon of each of the at least one second game object indicator corresponding to the first touch operation, the at least one first game object indicator of all game objects selected under a current game type, or covering and displaying, above the current at least one second game object indicator, the at least one first game object indicator of all game objects selected under the current game type. The embodiment of the disclosure does not limit this.

Figure 6:
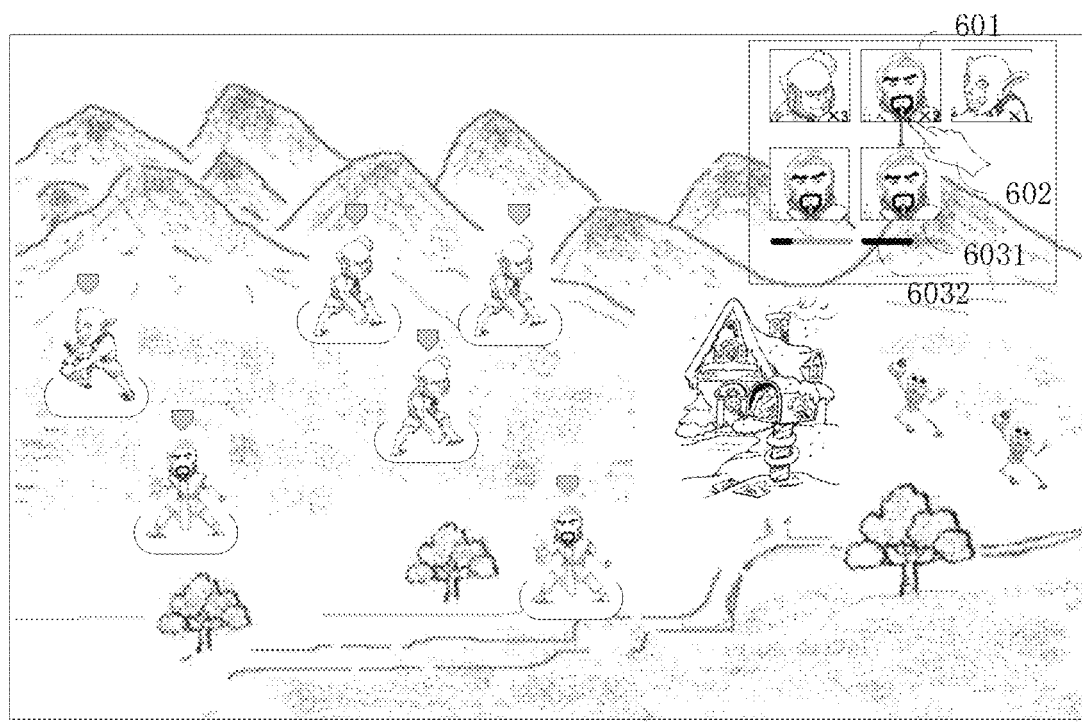
FIG. 6 is a schematic interface diagram 4 of a method for selecting a game object according to one embodiment of the disclosure.

The following is a detailed introduction with reference to FIG. 6. FIG. 6 is a schematic interface diagram 4 of a method for selecting a game object according to one embodiment of the disclosure. As shown in FIG. 6:

a second game object indicator 601 is included. The second game object indicator 601 in the object selection control is operated by a first touch operation 602. Here, it is assumed that the first touch operation 602 is a tap operation. Further, a third number of first game object indicators are displayed in the object selection control, wherein each of the third number of first game object indicators may include, for example, a type icon 6031 and survival identifier 6032 of the corresponding game objects. In the example shown in FIG. 6, it can be seen from the figure that the third number is 2, and two first game object indicators are displayed, which correspond to game objects selected in the types corresponding to the first touch operation 802 acting on the first display area. FIG. 6 is merely an illustration, and the embodiment of the disclosure does not specifically limit a specific implementation method of the object selection control and the second game object indicator.

According to the method for selecting a game object provided by the embodiment of the disclosure, in response to a first touch operation acting on the at least one second game object indicator, a third number of first game object indicators are displayed in the object selection control, so that a user can more intuitively and comprehensively obtain related information of game objects selected, thereby the experience of the user is improved.

Based on the above embodiment, according to the method for selecting a game object provided by the embodiment of the disclosure, each of the first game object indicators or each of the second game objects indicator may be operated, thereby further implementing a selection of game objects that are desired by the user. The method for selecting a game object provided by the present embodiment will be further described in detail below with reference to FIG. 7 to FIG. 10.

Figure 7:
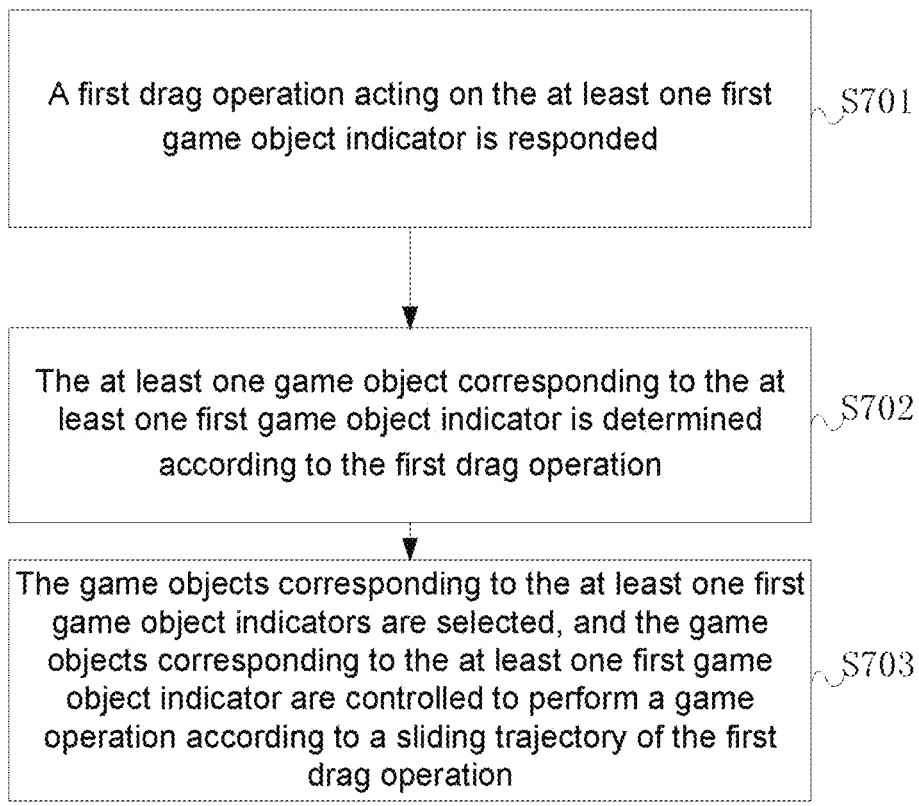
FIG. 7 is a flowchart 3 of a method for selecting a game object according to one embodiment of the disclosure.
Figure 8:
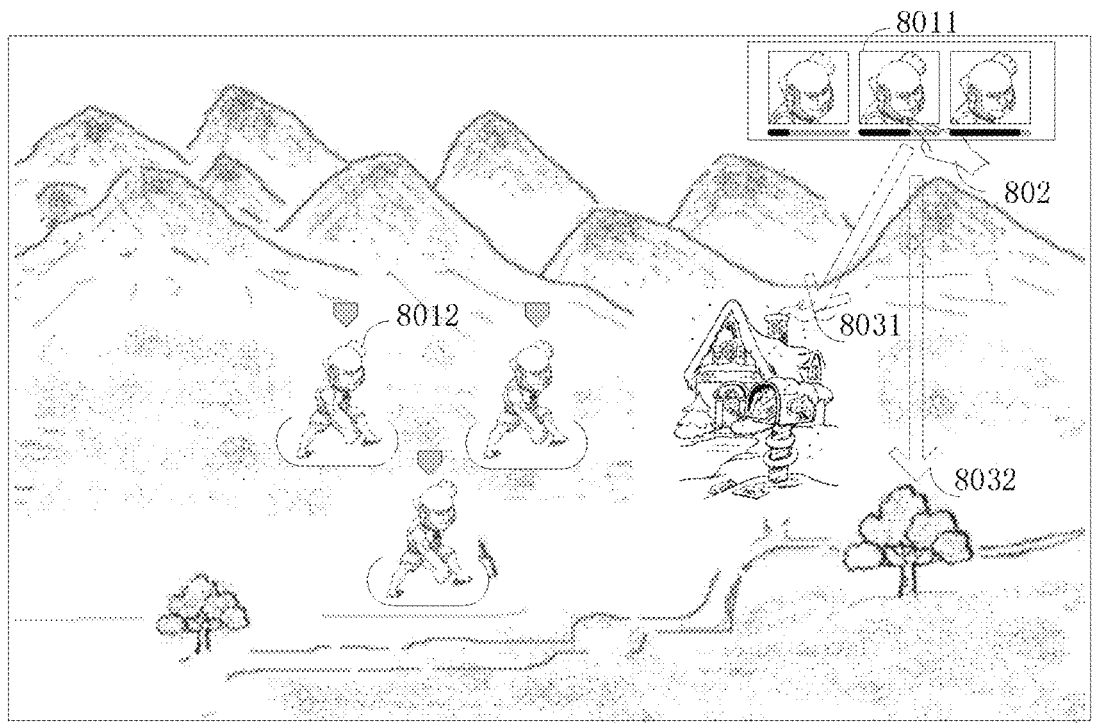
FIG. 8 is a schematic interface diagram 5 of a method for selecting a game object according to one embodiment of the disclosure.
Figure 9:
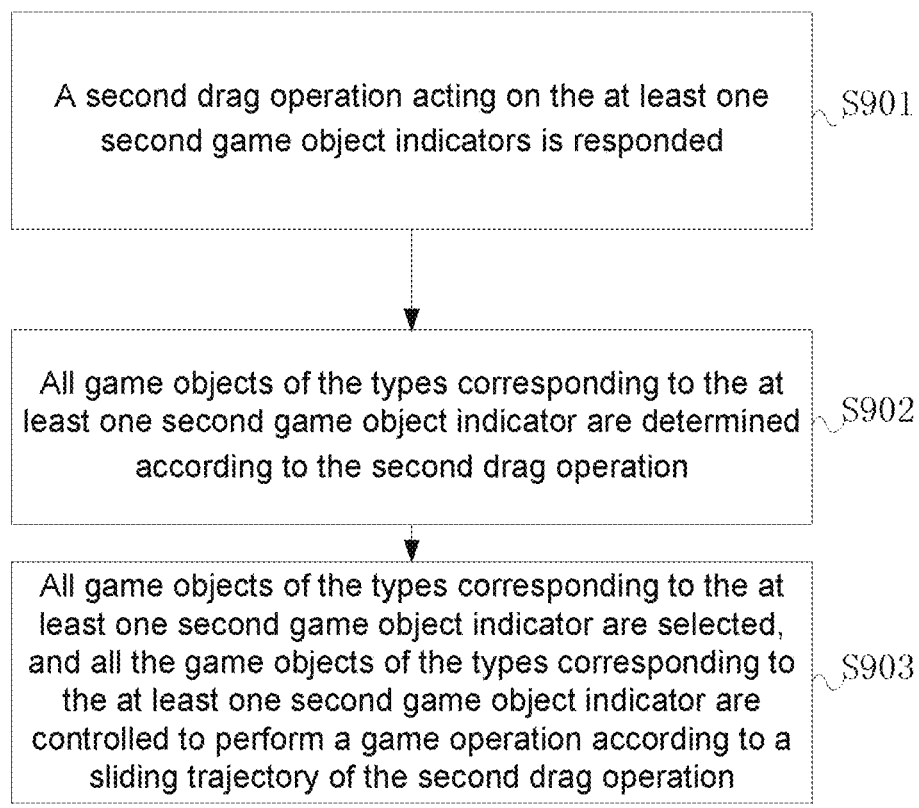
FIG. 9 is a flowchart 4 of a method for selecting a game object according to one embodiment of the disclosure.
Figure 10:
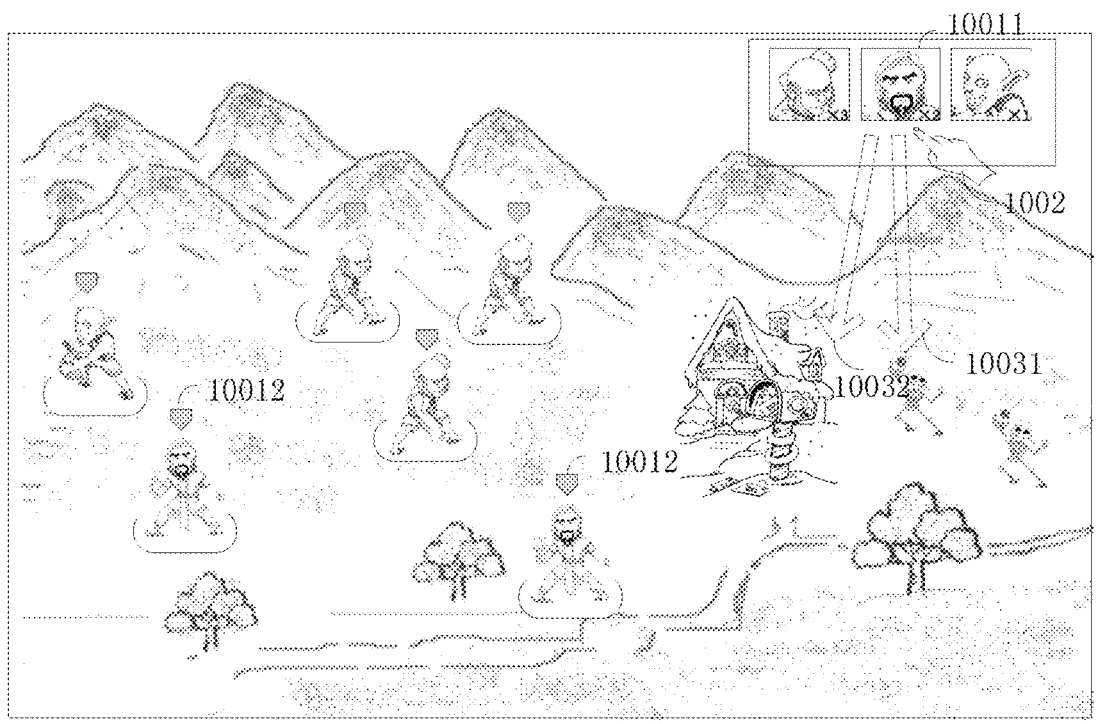
FIG. 10 is a schematic interface diagram 6 of a method for selecting a game object according to one embodiment of the disclosure.

FIG. 7 is a flowchart 3 of a method for selecting a game object according to one embodiment of the disclosure. FIG. 8 is a schematic interface diagram 5 of a method for selecting a game object according to one embodiment of the disclosure. FIG. 9 is a flowchart 4 of a method for selecting a game object according to one embodiment of the disclosure. FIG. 10 is a schematic interface diagram 6 of a method for selecting a game object according to one embodiment of the disclosure.

First, a process of operating the first game object indicator is described in detail.

Specifically, in response to a second touch operation acting on the at least one game object indicator, the game objects corresponding to the at least one first game object indicators are selected.

The first game object indicator may be, for example, a first game object indicator obtained in response to an object selection operation acting on the first display area, or may be a first game object indicator obtained, for example, in response to a first touch operation acting on a second game object indicator, which is not limited in the embodiment of the disclosure.

Further, at least one specific game object is selected in the first game object indicator by a second touch operation, wherein the second touch operation is used for selecting the at least one specific game object, and is also used for initiating at least one specific control instruction for the at least one game object selected. The second touch operation may be, for example, a tap operation, or may also be a double-tap operation, a drag operation, etc. The embodiments of the disclosure do not limit a specific implementation method of the second touch operation.

At least one game object corresponding to the at least one first game object indicator operated in the object selection control is at least one target game object, and the second touch operation which adopts a drag operation is taken as an example for further details.

Specifically, with reference to FIG. 7, as shown in FIG. 7, the each game object corresponding to each of the at least one first game object indicator is selected in response to a second touch operation acting on the first game object indicators include the following steps.

At S701, a first drag operation acting on the at least one first game object indicator is responded.

At S702, the at least one game object corresponding to the at least one first game object indicator is determined according to the first drag operation.

Specifically, a first drag operation is performed on the at least one first game object indicator in the object selection control, wherein the first drag operation corresponds to at least one specific first game object indicator. At least one corresponding target game object is determined according to a position of the first drag operation in the at least one first game object indicator.

At S703, the game objects corresponding to the at least one first game object indicators are selected, and the game objects corresponding to the at least one first game object indicator are controlled to perform a game operation according to a sliding trajectory of the first drag operation.

Further, during a process of triggering the first drag operation, the sliding trajectory is generated in the graphical user interface, and the target game object is further controlled to perform the game operation according to the sliding trajectory of the first drag operation. That is, the at least one first game object indicator in the object selection control is dragged to a target position, a sliding trajectory is generated in the graphical user interface during a dragging process, and at least one specific game object is further controlled to perform the game operation according to the sliding trajectory of the first drag operation.

Optionally, when performing the first drag operation, an icon of the different game objects in each of the first game object indicators may, for example, move along the sliding trajectory, or may not move at an original position. The present embodiment does not specifically limit this.

The sliding trajectory of the first drag operation is different, and a specific control behavior of the target object triggered is also different. For example, in a war game, a currently game object selected is an infantry, and the sliding trajectory of the first drag operation may be, for example, used for dragging the at least one first game object indicator of the infantry to an enemy unit object to control the infantry to attack the enemy unit object. For example, the at least one first game object indicator of the infantry is dragged to a house unit object to control the infantry to trim the house unit object. Those skilled in the art can understand that an operation triggered by dragging the at least one first game object indicator of at least one specific game object to a different target position may be preset in advance, according to a specific game. The embodiment of the disclosure does not limit this.

The following is a detailed introduction with FIG. 8 as an example. As shown in FIG. 8, assuming that there are currently three game objects selected, a first game object indicator 8011 of a specific game object is selected by the object selection control, wherein the first game object indicator 8011 of the specific game object corresponds to a target game object 8012 in a first display area. For example, the first game object indicator 8011 of the specific game object may be dragged to the house unit object by a first drag operation. At this time, according to a generated sliding trajectory 8031, the target game object 8012 may be controlled to move to a location of the house unit object, and the house unit object may be trimmed and the like.

Optionally, for example, the first game object indicator 8011 of the specific game object may be dragged to a tree unit object by the first drag operation. At this time, the target game object 8012 may be controlled to move to a location of the tree unit object according to a generated sliding trajectory 8032 to perform operations such as felling on the tree unit object. FIG. 8 is only an exemplary description and is not a unique implementation method. In the present embodiment, the specific implementation method of each game object selected corresponding to each of the at least one first game object indicator, in response to a second touch operation acting on at least one the first game object indicator is not particularly limited.

The above is an introduction to an operation of each of the first game object indicators obtained in response to the object selection operation acting on the first display area. When a third number of first game object indicators is obtained in response to the first touch operation acting on at least one second game object indicator, the implementation method is similar, and will not be repeated.

Second, a process of operating at least one second game object indicator is described in detail.

Specifically, in response to a third touch operation acting on at least one second game object indicator, the game objects of the types corresponding to the at least one second game object indicator are selected.

The third touch operation may be, for example, a double-tap operation or a drag operation and so on, but the third touch operation is different from the first touch operation. For example, when the first touch operation is a tap operation, the third touch operation may be any operation other than the tap operation. The above is only an exemplary introduction. The embodiment of the disclosure does not limit a specific implementation method of the third touch operation, as long as it is distinguished from the first touch operation.

Further, game objects of the types corresponding to the at least one second game object indicator is selected in the at least one second game object indicator by a third touch operation, wherein the third touch operation is used for selecting a game object corresponding to a specific type, and is also used for initiating at least one specific control instruction for the game object selected. The third touch operation which adopts the second drag operation is used as an example for further detailed description.

Specifically, with reference to FIG. 9, as shown in FIG. 9, the operation that the game objects of the types corresponding to the second game object indicators are selected in response to a third touch operation acting on the second game object indicators include the following steps.

At S901, a second drag operation acting on the at least one second game object indicators is responded.

At S902, all game objects of the types corresponding to the at least one second game object indicator are determined according to the second drag operation.

Specifically, a second drag operation is acting on the at least one second game object indicator in the object selection control, wherein the second drag operation corresponds to at least one specific second game object indicator. At least one corresponding target game objects is determined according to a position of the second drag operation in each of the second game object indicators.

At S903, all game objects of the types corresponding to the at least one second game object indicator are selected, and all the game objects of the types corresponding to the at least one second game object indicator are controlled to perform a game operation according to a sliding trajectory of the second drag operation.

Specifically, the at least one second game object indicator corresponds to certain types of all game objects selected. By performing a second drag operation on the at least one second game object indicator, the selection and control of all the game objects selected under game types corresponding to the at least one second game object indicator may be implemented.

The following is a detailed introduction with reference to FIG. 10. As shown in FIG. 10, one second game object indicator 10011 is selected by a second drag operation 1002. It is assumed that a game type corresponding to the second game object indicator 10011 is a game type of a target game object 10012 given in FIG. 10. Further, the second drag operation 1002 triggers a sliding trajectory on the graphical user interface, and controls all game objects under a specific game type to perform a game operation according to the sliding trajectory. In the example shown in FIG. 10, all game objects of the type corresponding to the second game object indicator 10011 are multiple target game objects 10012 in the first display area. For example, the multiple target game objects 10012 are controlled to reach a location of an enemy unit object according to the sliding trajectory 10031 and attack the enemy unit. For example, according to the sliding trajectory 10032, the multiple target game objects 10012 may be controlled to reach a location of a house unit object and be trained in the house.

FIG. 10 is only an exemplary introduction. A specific implementation method of the object selection control in the embodiment of the disclosure is not particularly limited. Further, those skilled in the art can understand that the second game object indicator is dragged by the second drag operation to move to different positions to trigger different preset operations, which is not limited in the embodiment of the disclosure.

According to a method for selecting a game object provided by the embodiment of the disclosure, each of the game objects corresponding to each of the at least one first game object indicator is selected by responding to a second touch operation acting on the at least one first game object indicator, so as to select and control specific game objects through the second touch operation, so that the player can efficiently select a target game object and further realize an operation on the target game object. Further, by responding to a third touch operation acting on at least one second game object indicator, game objects of types corresponding to the at least one second game object indicator are selected, so that all game objects selected under each of the types corresponding to each of the at least one second game object indicator can be selected and controlled. By providing an operation of the at least one second game object indicator and a selection of all game types of the corresponding type, a certain type of game object can be accurately and efficiently selected, thereby the game experience of the players improved.

Based on the above embodiments, the method for selecting a game object provided by the embodiment of the disclosure further includes that: a cancel operation triggered by operating a category control is acquired; and the object selection control is deleted on the graphical user interface according to the cancel operation.

Specifically, the embodiment of the disclosure further provides a category control. The category is used for controlling game object selected. The category control may include, for example, a cancel control, and may also include, for example, a full selection control, etc. The embodiment of the disclosure does not particularly limit the category control. Further, the cancel operation may be triggered by operating the category control. A triggering mode may be, for example, long-pressing the first game object indicator or the second game object indicator corresponding to game objects to be deselected, or dragging the first game object indicator or the second game object indicator of the game objects to be deselected onto the corresponding category control. The embodiment of the disclosure does not specifically limit an implementation method of triggering the cancel operation.

Further, according to the cancel operation, the game objects to be deselected may be turned into an unselected state, so that the corresponding first game object indicator or second game object indicator may be deleted in the object selection control.

By providing the category control to trigger the cancel operation, it is possible to cancel a selection of the wrongly selected game object through the cancel operation when the player selects the game object that is not desired due to false operation, which further enables the player to select the target game object more accurately and efficiently.

Based on the above embodiments, optionally, a method of triggering a cancel operation is acquiring the cancel operation triggered by dragging the first game object indicator to the cancel control.

By acquiring the cancel operation triggered by dragging the first game object indicator to the cancel control, the wrongly selected game object can be efficiently and conveniently deselected, thereby making the game more flexible.

Based on the above embodiments, further, the method provided by the embodiment of the disclosure further includes that: a cancel operation triggered by operating a category control is acquired; and the object selection control is deleted on the graphical user interface according to the cancel operation.

Specifically, when the player wants to deselect all game objects selected, it is possible to trigger the cancel operation by operating a prompt control. Specifically, the selection control may include, for example, all cancel controls, and may also include, for example, a full selection control and a cancel control. The method for triggering the cancel operation may be, for example, clicking all cancel controls, or for example, dragging the circle control onto the cancel control, thereby triggering the cancel operation. The embodiment of the disclosure does not limit a specific implementation method of triggering the cancel operation.

Further, the object selection control may be deleted on the graphical user interface according to the cancel operation, and all game objects selected are deselected.

Figure 11:
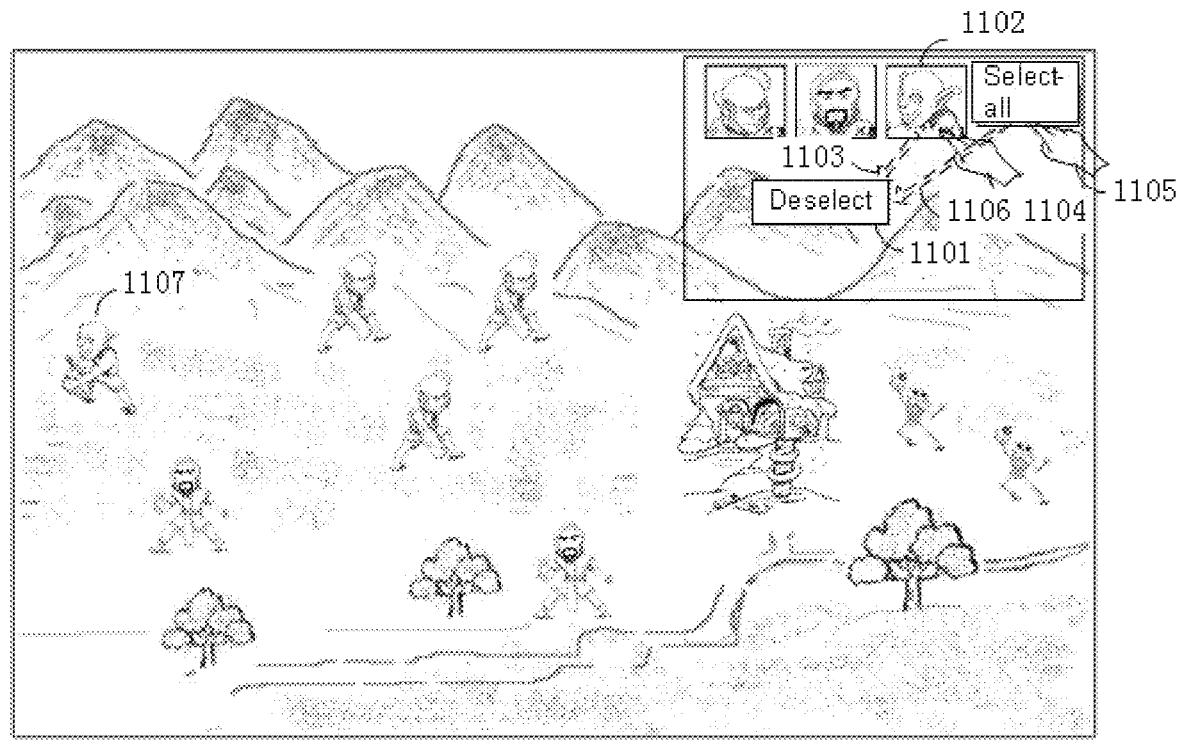
FIG. 11 is a schematic interface diagram 7 of a method for selecting a game object according to one embodiment of the disclosure.

The cancel operation will be described in detail below with reference to FIG. 11. FIG. 11 is a schematic interface diagram 7 of a method for selecting a game object according to one embodiment of the disclosure. As shown in FIG. 11, a cancel control 1101 is included. Assuming that a current game object to be deselected corresponds to a second game object indicator 1102, a corresponding game object to be deselected in the figure is 1107. At this time, the second game object indicator 1102 is dragged to the cancel control 1101 by a cancel operation 1104, and a sliding trajectory 1103 is triggered on the graphical user interface to trigger the cancel operation to change a state of the game object to be deselected. As shown in FIG. 11, the game object 1107 to be deselected becomes an unselected state.

Optionally, FIG. 11 further includes a full selection control 1105. By dragging the full selection control 1105 to the cancel control 1101, a sliding trajectory 1106 is triggered on the graphical user interface, thereby triggering a cancel operation to deselect all the game objects selected and correspondingly delete the object selection control. In the example shown in FIG. 11, for the sake of illustration, the object selection control is not deleted. It can be seen from FIG. 11 that all game objects selected are deselected.

In summary, the category control provided in the embodiment of the disclosure can trigger a cancel operation, thereby realizing the deselection of a specific game object and the deselection of all game objects selected, and the flexibility of the game operation is improved.

Based on the above embodiments, in the method for selecting a game object provided by the embodiment of the disclosure, when responding to an object selection operation acting on a first display area on a graphical user interface, the method further include the following step: When a selection control on the graphical user interface is operated, a game object selected is acquired according to the selection operation on the graphical user interface.

Specifically, the selection control on the graphical user interface may include, for example, a multi-select control. By clicking the multi-select control or long-pressing the multi-select control, the graphical user interface is controlled to enter a state of selecting a game object. Further, in the graphical user interface, a series of selection operations such as a single-tap operation or a double-tap operation are used for acquiring the game object selected. The embodiment of the disclosure does not particularly limit the method of acquiring the game object selected.

A selection of the game object is realized by operating the selection control, which can solve a problem of a conflict of multiple operation methods caused by the overlap of an input device and a display device of the game. When the graphical user interface is in a state of selecting an game object, only the object selection input is accepted, which does not contradict the rest of input commands, thereby implementing the expansion of game control.

Figure 12:
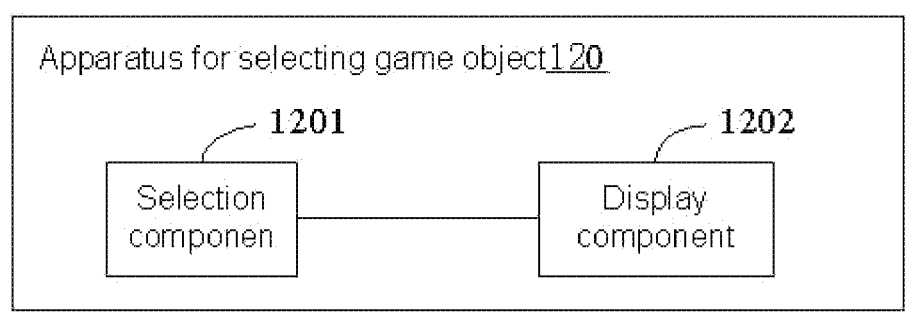
FIG. 12 is a schematic structure diagram 1 of an apparatus for selecting a game object according to one embodiment of the disclosure.

FIG. 12 is a schematic structure diagram 1 of an apparatus for selecting a game object according to an embodiment of the disclosure. As shown in FIG. 12, the apparatus 120 for selecting a game object includes: a selection component 1201 and a display component 1202.

The selection component 1201 is configured to select, in response to an object selection operation acting on a first display area on a graphical user interface, multiple game objects in a game scene.

The display component 1202 is configured to display an object selection control in a second display area of the graphical user interface;

display, when the multiple game objects belong to the same type of game objects, a first number of first game object indicators in the object selection control, wherein each of the first number of the first game object indicators corresponds to each of the game objects; and display, when the multiple game objects belong to different types of game objects, a second number of second game object indicators in the object selection control, wherein each of the second number of second game object indicators corresponds to each type of the game objects.

Optionally, when the multiple game objects belong to different types of game objects, the display component 1202 is further configured to:

display, in response to a first touch operation acting on at least one second game object indicators, a third number of first game object indicators in the object selection control.

Optionally, the selection component 1201 is further configured to:

select, in response to a second touch operation acting on at least one the first game object indicators, the each game object corresponding to each of the at least one first game object indicator; or select, in response to a third touch operation acting on the second game object indicators, the game objects of the types corresponding to the at least one second game object indicator.

Optionally, each of the at least one first game object indicator includes first information, wherein the first information is used for indicating a preset attribute of each of the game objects; and Each of the second game object indicators include second information and third information, wherein the second information is used for indicating the type of each game object corresponding to the second information, and the third information is used for indicating a number of game objects selected from game objects having the type of each game object corresponding to the third information.

Optionally, the selection component 1201 is specifically configured to:

respond to a first drag operation acting on the at least one first game object indicator;

determine the game objects corresponding to the at least one first game object indicator according to the first drag operation; and select the game objects corresponding to the at least one first game object indicator, and control the game objects corresponding to the at least one first game object indicator to perform a game operation according to a sliding trajectory of the first drag operation.

Optionally, the selection component 1201 is specifically configured to:

respond to a second drag operation acting on the at least one second game object indicator;

determine all game objects of the types corresponding to the at least one second game object indicator according to the second drag operation; and select all game objects of the types corresponding to the at least one second game object indicator, and control all game objects of the types corresponding to the at least one second game object indicator to perform a game operation according to a sliding trajectory of the second drag operation.

The apparatus provided in the present embodiment may be used for executing the technical solutions of the foregoing method embodiments, and the implementation principles and technical effects are similar. The present embodiment will not be described here.

Figure 13:
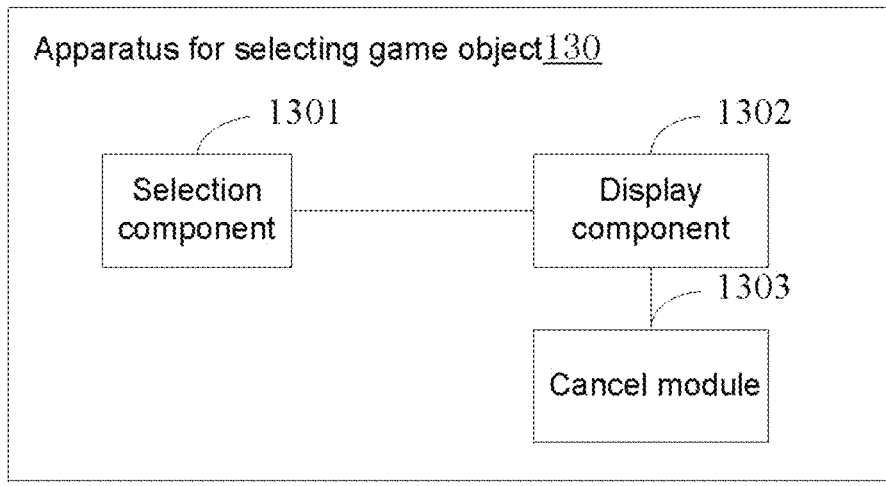
FIG. 13 is a schematic structure diagram 2 of an apparatus for selecting a game object according to one embodiment of the disclosure.

FIG. 13 is a schematic structure diagram 2 of an apparatus for selecting a game object according to an embodiment of the disclosure. As shown in FIG. 13, based on the embodiment of FIG. 12, in the present embodiment, when the multiple game objects belong to the same type of game objects, the apparatus further includes: a cancel module 1303.

The cancel module 1303 is configured to acquire a cancel operation triggered by operating the at least one first game object indicator; and delete the at least one first game object indicator corresponding to the cancel operation in the object selection control according to the cancel operation.

Optionally, the cancel module 1303 is specifically configured to:

acquire the cancel operation triggered by dragging the at least one first game object indicator to the cancel control.

Optionally, the selection component 1301 is further configured to:

acquire a cancel operation triggered by operating a prompt control; and delete the object selection control on the graphical user interface according to the cancel operation.

Optionally, the selection component 1301 is specifically configured to:

lock the graphical user interface when a selection control on the graphical user interface is operated; and select, in response to a tap operation or a circle operation on the first display area on the graphical user interface, multiple game objects from the game scene until the selection control is stopped to operate.

Optionally, the selection component 1301 is specifically configured to:

acquire the type of each of the multiple game objects selected; and display the object selection control in the second display area of the graphical user interface according to the type of each of the multiple game objects selected.

The apparatus provided in the present embodiment may be used for executing the technical solutions of the foregoing method embodiments, and the implementation principles and technical effects are similar. The present embodiment will not be described here.

Figure 14:
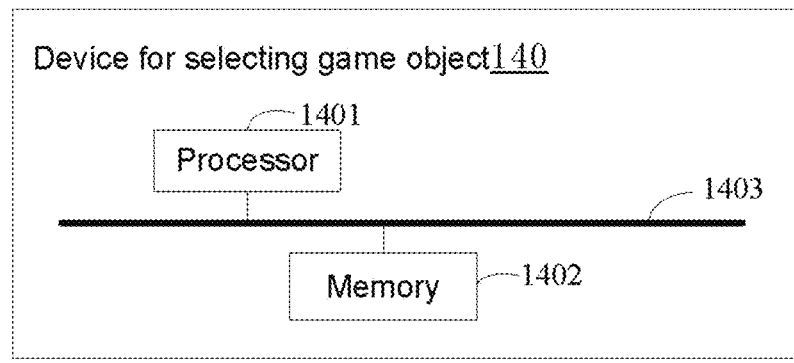
FIG. 14 is a schematic hardware structure diagram of a device for selecting a game object according to one embodiment of the disclosure.

FIG. 14 is a schematic hardware structure diagram of a device for selecting a game object according to an embodiment of the disclosure. As shown in FIG. 14, a device 140 of the present embodiment includes: a processor 1401 and a memory 1402.

The memory 1402 is connected with the processor and configured to store at least one executable instruction of the processor.

The processor 1401 is configured to execute the at least one executable instruction stored in the memory to implement various steps performed by the apparatus for selecting a game object in the above embodiments. For details, reference may be made to the related description in the foregoing method embodiments.

Optionally, the memory 1402 may be independent or integrated with the processor 1401.

When the memory 142 is independently provided, the device for selecting a game object further includes a bus 1403 for connecting the memory 1402 and the processor 1401.

An embodiment of the disclosure also provides a non-transitory storage medium that stores at least one computer program. When the processor executes the at least one computer program, the method for selecting a game object performed by a device for selecting a game object is implemented.

In some embodiments provided by the disclosure, it should be understood that the disclosed device and method may be implemented in another method. For example, the device embodiment described above is only schematic, and for example, division of the component is only logic function division, and other division methods may be adopted during practical implementation. For example, multiple components may be combined or integrated into another system, or some features may be neglected or not executed. In addition, coupling or direct coupling or communication connection between each displayed or discussed component may be indirect coupling or communication connection, implemented through some interfaces, of the device or the components, and may be electrical and mechanical or adopt other forms.

The integrated module realized in the form of a software functional module may be stored in the non-transitory medium. The software functional module is stored in the non-transitory storage medium, including multiply instructions enabling a computer device (which may be a personal computer, a server, a network device or the like) or a processor to execute part of the steps of the method in each embodiment of the disclosure.

It should be understood that the processor may be a Central Processing Unit (CPU), or may be other general purpose processors, a Digital Signal Processor (DSP), an Disclosure Specific Integrated Circuit (ASIC), or the like. The general purpose processor may be a microprocessor, or the processor may also be any conventional processor, etc. The steps of the method disclosed in combination with the present invention may be directly embodied as a hardware processor for execution and completion, or a combination of hardware and software modules in the processor for execution and completion.

The memory may include a high-speed Random Access Memory (RAM), may also include a non-transitory Memory (NVM) such as at least one magnetic disk memory, and may also be a U disk, a mobile hard disk, a Read Only Memory (ROM), a magnetic disk, or an optical disk.

The bus may be an Industry Standard Architecture (ISA) bus, a Peripheral Component (PCI) bus, or an Extended Industry Standard Architecture (EISA) bus. The bus may be divided into an address bus, a data bus, a control bus, and the like. For ease of representation, the bus in the drawings of the disclosure does not limit to only one bus or one type of bus.

The above non-transitory storage medium may be implemented by any type of transitory or non-transitory storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a ROM, a magnetic memory, a flash memory, a magnetic disk or an optical disk. The storage medium may be any available medium that can be accessed by a general purpose or special purpose computer.

Those of ordinary skill in the art may understand that all or part of the steps of the foregoing method embodiments may be completed by a program instructing relevant hardware. The foregoing program may be stored in a non-transitory storage medium. When the program is executed, the steps including the foregoing method embodiments are performed. The foregoing storage medium includes various media capable of store program codes, such as a ROM, a RAM, a magnetic disk, or an optical disk.

Finally, it should be noted that the above embodiments are only used to illustrate the technical solutions of the disclosure, and are not limited thereto. Although the disclosure has been described in detail with reference to the foregoing embodiments, those skilled in the art should understand that the technical solutions described in the foregoing embodiments are modified, or some or all technical features are equivalently replaced, but the modifications and replacements do not make the essence of the corresponding technical solutions depart from the scope of the technical solutions of various embodiments of the disclosure.

What is claimed is:

1. A method for selecting a game object, applied to a terminal rendered with a graphical user interface, wherein contents displayed on the graphical user interface comprise a first display area and a second display area, and the first display area comprises at least a part of a game scene, the method comprising:
   in response to an object selection operation acting on the first display area on the graphical user interface, selecting a plurality of game objects in the game scene;
   displaying an object selection control in the second display area on the graphical user interface;
   when the plurality of game objects belong to the same type of game objects, displaying a first number of first game object indicators in the object selection control, wherein each of the first number of first game object indicators corresponds to each of the game objects; and/or
   when the plurality of game objects belong to different types of game objects, displaying a second number of second game object indicators in the object selection control, wherein each of the second number of second game object indicators corresponds to each types of the game objects.

2. The method as claimed in claim 1, wherein when the plurality of game objects belong to different types of game objects, the method further comprising:
in response to a first touch operation acting on at least one second game object indicator, displaying a third number of first game object indicators in the object selection control.

3. The method as claimed in claim 2, wherein the third number is a number of game objects contained in types of game objects corresponding to the at least one second game object indicator.

4. The method as claimed in claim 2, further comprising:
in response to a second touch operation acting on at least one first game object indicator, selecting each game object corresponding to each of the at least one first game object indicator.

5. The method as claimed in claim 2, further comprising:
in response to a third touch operation acting on at least one second game object indicator, selecting game objects of the types corresponding to the at least one second game object indicator.

6. The method as claimed in claim 1, further comprising:
in response to a second touch operation acting on at least one first game object indicator, selecting each game object corresponding to each of the at least one first game object indicator.

7. The method as claimed in claim 6, wherein each of the at least one first game object indicator comprises first information, and the first information is used for indicating a preset attribute of each of the game object.

8. The method as claimed in claim 7, wherein in response to the second touch operation acting on the at least one first game object indicator, selecting each game object corresponding to each of the at least one first game object indicators comprises:
responding to a first drag operation acting on the at least one first game object indicator;
determining the game objects corresponding to the at least one first game object indicator according to the first drag operation; and
selecting the game objects corresponding to the at least one first game object indicator, and controlling the game objects corresponding to the at least one first game object indicator to perform a game operation according to a sliding trajectory of the first drag operation.

9. The method as claimed in claim 7, wherein when the plurality of game objects belong to the same type of game objects, the method further comprises:
acquiring a cancel operation triggered by operating the at least one first game object indicator; and
deleting the at least one first game object indicator corresponding to the cancel operation in the object selection control according to the cancel operation.

10. The method as claimed in claim 9, wherein acquiring the cancel operation triggered by operating the at least one first game object indicator comprises:
acquiring the cancel operation triggered by dragging the at least one first game object indicator to the cancel control.

11. The method as claimed in claim 7, further comprising:
acquiring a cancel operation triggered by operating a prompt control; and
deleting the object selection control on the graphical user interface according to the cancel operation.

12. The method as claimed in claim 1, wherein in response to the object selection operation acting on the first display area on the graphical user interface, selecting the plurality of game objects in the game scene comprises:
locking the graphical user interface when operating a selection control on the graphical user interface; and
in response to a tap operation or a circle operation on the first display area on the graphical user interface, selecting the plurality of game objects from the game scene until the selection control is stopped to operate.

13. The method as claimed in claim 1, wherein displaying the object selection control in the second display area of the graphical user interface comprises:
acquiring the type of each of the plurality of game objects selected; and
displaying the object selection control in the second display area on the graphical user interface according to the type of each of the plurality of game objects.

14. The method as claimed in claim 1, wherein the first number is less than or equal to a number of the plurality of game objects selected.

15. The method as claimed in claim 1, wherein the second number is less than or equal to a number of types of the plurality of game objects selected.

16. The method as claimed in claim 1, further comprising:
in response to a third touch operation acting on at least one second game object indicator, selecting game objects of the types corresponding to the at least one second game object indicator.

17. The method as claimed in claim 16, wherein each of the second game object indicators comprises second information and third information, wherein the second information is used for indicating the type of each game object corresponding to the second information, and the third information is used for indicating a number of game objects selected from game objects having the type of each game object corresponding to the third information.

18. The method as claimed in claim 17, wherein in response to the third touch operation acting on the at least one second game object indicator, selecting game objects of the types corresponding to the at least one second game object indicator comprises:
in response to a second drag operation acting on the at least one second game object indicator;
determining all game objects belonging to the types corresponding to the at least one second game object indicator according to the second drag operation; and
selecting all game objects belonging to the types corresponding to the at least one second game object indicator, and controlling all the game objects belonging to the types corresponding to the at least one second game object indicator to perform a game operation according to a sliding trajectory of the second drag operation.

19. A device for selecting a game object, comprising:
a memory, configured to store a program; and
a processor; and
a memory, connected with the processor and configured to store at least one executable instruction of the processor,
wherein the processor is arranged to execute the at least one executable instruction, and the at least one executable instruction comprises:
in response to an object selection operation acting on a first display area on a graphical user interface, selecting a plurality of game objects in a game scene;

displaying an object selection control in a second display area of the graphical user interface;

when the plurality of game objects belong to the same type of game objects, displaying a first number of first game object indicators in the object selection control, wherein each of the first number of first game object indicators corresponds to each of the game objects; and/or when the plurality of game objects belong to different types of game objects, displaying a second number of second game object indicators in the object selection control, wherein each of the second number of second game object indicators corresponds to each type of the game objects.

20. A non-transitory storage medium, storing a computer program, on which at least one computer program is stored, the at least one computer program being executed by a processor to implement the following steps:

in response to an object selection operation acting on a first display area on a graphical user interface, selecting a plurality of game objects in a game scene;

displaying an object selection control in a second display area of the graphical user interface;

when the plurality of game objects belong to the same type of game objects, displaying a first number of first game object indicators in the object selection control, wherein each of the first number of first game object indicators corresponds to each of the game objects; and/or when the plurality of game objects belong to different types of game objects, displaying a second number of second game object indicators in the object selection control, wherein each of the second number of second game object indicators corresponds to each type of the game objects.

* * * * *